US012757293B2

(12) United States Patent
Kim

(10) Patent No.: US 12,757,293 B2
(45) Date of Patent: Oct. 6, 2026

(54) METHOD AND APPARATUS FOR BANDWIDTH PART SWITCHING FOR A MULTICAST SESSION IN A WIRELESS COMMUNICATION SYSTEM

(71) Applicant: LG ELECTRONICS INC., Seoul (KR)

(72) Inventor: Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 346 days.

(21) Appl. No.: 18/568,749

(22) PCT Filed: Jul. 22, 2022

(86) PCT No.: PCT/KR2022/010821
§ 371 (c)(1),
(2) Date: Dec. 8, 2023

(87) PCT Pub. No.: WO2023/008847
PCT Pub. Date: Feb. 2, 2023

(65) Prior Publication Data

US 2024/0276597 A1 Aug. 15, 2024

(30) Foreign Application Priority Data

Jul. 29, 2021 (KR) ........................ 10-2021-0100073

(51) Int. Cl.
*H04W 76/40* (2018.01)
*H04W 76/11* (2018.01)

(52) U.S. Cl.
CPC ............ *H04W 76/40* (2018.02); *H04W 76/11* (2018.02)

(58) Field of Classification Search
CPC ..... H04W 76/40; H04W 76/11; H04W 68/12; H04L 5/0053; H04L 5/001; H04L 5/0098
See application file for complete search history.

(56) References Cited

U.S. PATENT DOCUMENTS

2019/0075585 A1* 3/2019 Deogun ............ H04W 72/1268
2019/0394776 A1 12/2019 Lee et al.
(Continued)

FOREIGN PATENT DOCUMENTS

EP 4207936 7/2023
EP 4501059 2/2025
(Continued)

OTHER PUBLICATIONS

PCT International Application No. PCT/KR2022/010821, International Search Report dated Nov. 9, 2022, 3 pages.
(Continued)

*Primary Examiner* — Kiet Tang
(74) *Attorney, Agent, or Firm* — LEE, HONG, DEGERMAN, KANG & WAIMEY

(57) ABSTRACT

A method and apparatus for bandwidth part switching for a multicast session in a wireless communication system is provided. A wireless device receives a paging in the initial BWP, wherein the paging includes a multicast session identity (ID) for the multicast session. The wireless device establishes and/or resumes a radio resource control (RRC) connection in the initial BWP as an active BWP. The wireless device switches autonomously the active BWP from the initial BWP to the specific BWP.

17 Claims, 16 Drawing Sheets

(56) References Cited

U.S. PATENT DOCUMENTS

| | | | | |
|---|---|---|---|---|
| 2020/0288507 | A1* | 9/2020 | Chang | H04W 74/0833 |
| 2021/0159966 | A1* | 5/2021 | Xi | H04W 72/046 |
| 2021/0274417 | A1* | 9/2021 | Zhou | H04W 36/00837 |
| 2022/0210766 | A1* | 6/2022 | Liu | H04W 72/30 |
| 2023/0353987 | A1* | 11/2023 | Babaei | H04W 72/231 |

FOREIGN PATENT DOCUMENTS

| | | |
|---|---|---|
| WO | 2021139597 | 7/2021 |
| WO | 2023182864 | 9/2023 |

OTHER PUBLICATIONS

Samsung, "On NR MBS operation in Idle/Inactive mode," 3GPP TSG-RAN WG2 #114-e, R2-2104984, May 2021, 8 pages.
Intel Corporation, "Discussion on SA2 LS and Multicast Session Activation," 3GPP TSG-RAN WG2 Meeting #113bis-e, R2-2102838, Apr. 2021, 8 pages.
Huawei et al., "Discussion on group notification for multicast session activation," 3GPP TSG-RAN WG2 Meeting #113bis, R2-2103905, Apr. 2021, 4 pages.
Ericsson, "Open issues for UEs in idle or inactive mode," 3GPP TSG-RAN2 Meeting #113bis-e, R2-2103776, Apr. 2021, 18 pages.
European Patent Office Application Serial No. 22849823.4, Search Report dated May 16, 2025, 10 pages.

* cited by examiner

METHOD AND APPARATUS FOR BANDWIDTH PART SWITCHING FOR A MULTICAST SESSION IN A WIRELESS COMMUNICATION SYSTEM

CROSS-REFERENCE TO RELATED APPLICATION(S)

This application is the National Stage filing under 35 U.S.C. 371 of International Application No. PCT/KR2022/010821, filed on Jul. 22, 2022, which claims the benefit of earlier filing date and right of priority to Korean Application No. 10-2021-0100073, filed on Jul. 29, 2021, the contents of which are all incorporated by reference herein in their entirety.

TECHNICAL FIELD

The present disclosure relates to a method and apparatus for bandwidth part switching for a multicast session in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

The group paging may be used to simultaneously page numerous UEs in RRC_IDLE/INACTIVE, which are interested in the same multicast session. If UE receives the group paging including an identity of the multicast session of interest, the UE may enter RRC_CONNECTED to receive the multicast session.

Since the multicast session is transmitted using a certain bandwidth part, though the transition to RRC_CONNECTED is complete, UE cannot receive the multicast session of interest until the network command is received, that indicates BWP switching to the certain BWP.

Considering that numerous UEs simultaneously enter RRC_CONNECTED to receive the same multicast session, the network may spend a huge radio resource to command each UE using dedicated radio resource to switch the active BWP to the certain BWP. Thus, the switching command may be delayed for some UEs.

Therefore, studies for bandwidth part switching for a multicast session in a wireless communication system are required.

In an aspect, a method performed by a wireless device in a wireless communication system is provided. The method comprises joining a multicast session provided in a specific bandwidth part (BWP); monitoring an initial BWP upon entering an idle and/or inactive state; receiving a paging in the initial BWP, wherein the paging includes a multicast session identity (ID) for the multicast session; establishing and/or resuming a radio resource control (RRC) connection in the initial BWP as an active BWP; and switching autonomously the active BWP from the initial BWP to the specific BWP.

In another aspect, an apparatus for implementing the above method is provided.

The present disclosure can have various advantageous effects.

According to some embodiments of the present disclosure, a wireless device could efficiently perform the bandwidth part (BWP) switching for a multicast session of interest.

For example, a wireless network could save the resource for the BWP switching for the multicast session of interest. That is, since the wireless device perform the BWP switching for a multicast session without a BWP switching command from the network, the wireless network could save the resources for the BWP switching command.

In other words, after transmitting a group paging, the network may not need to command the BWP switching using dedicated signalling to all UEs which enters RRC_CONNECTED simultaneously.

Thus, UE may not need to wait the network command to receive the multicast session of interest, and can immediately receive the multicast session upon entering RRC_CONNECTED.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
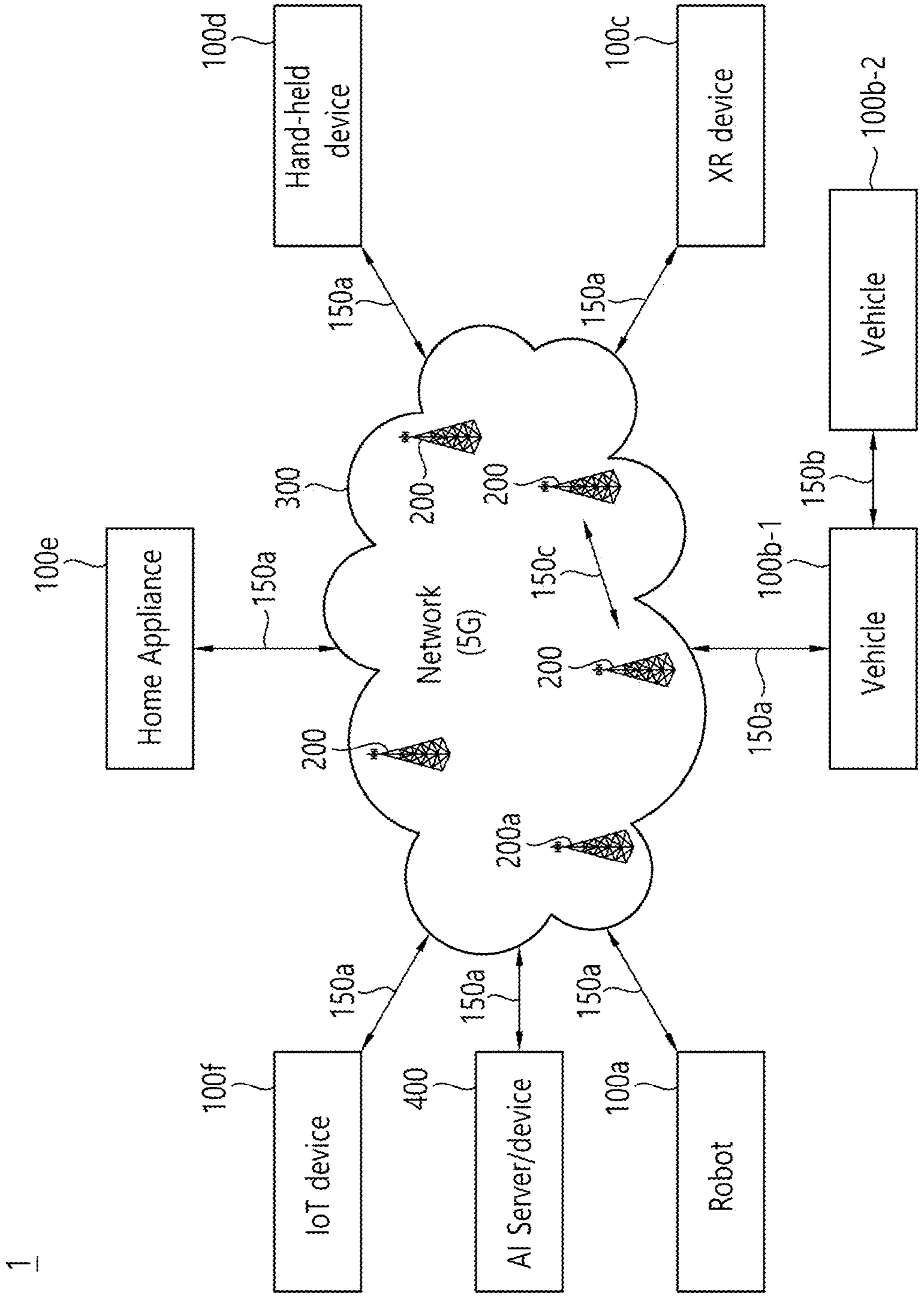
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
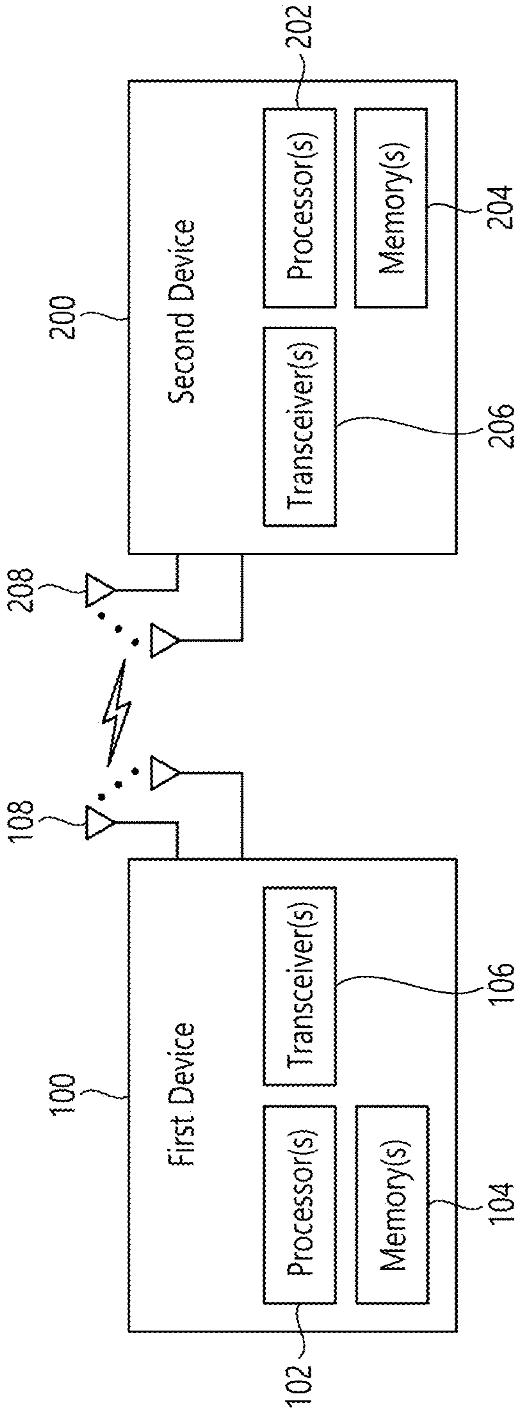
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to '} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
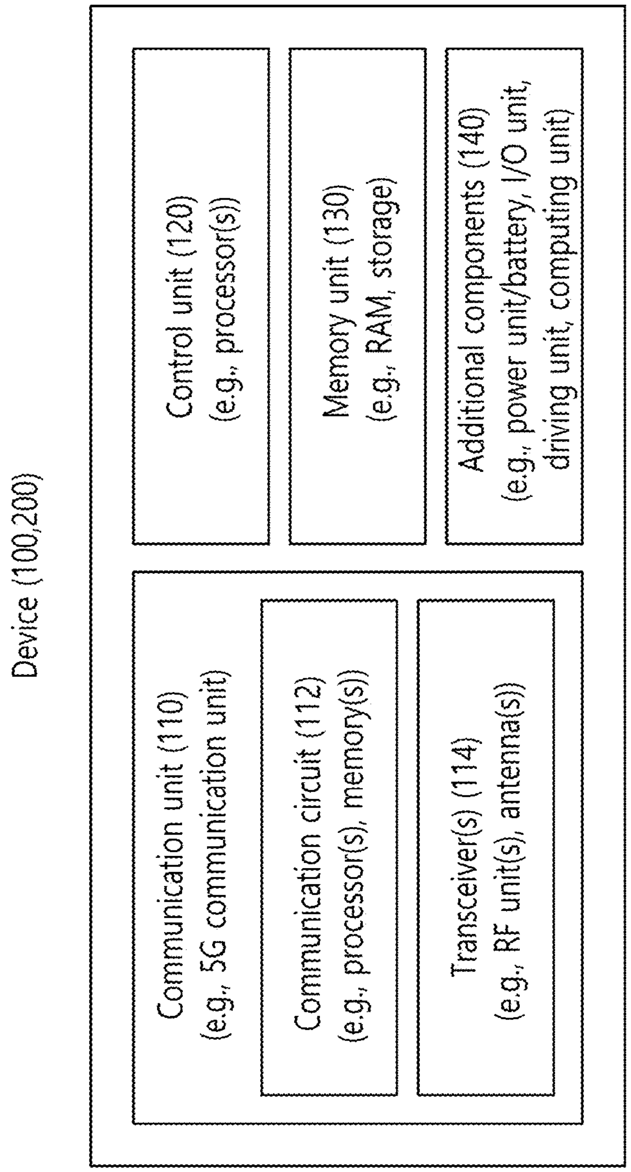
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
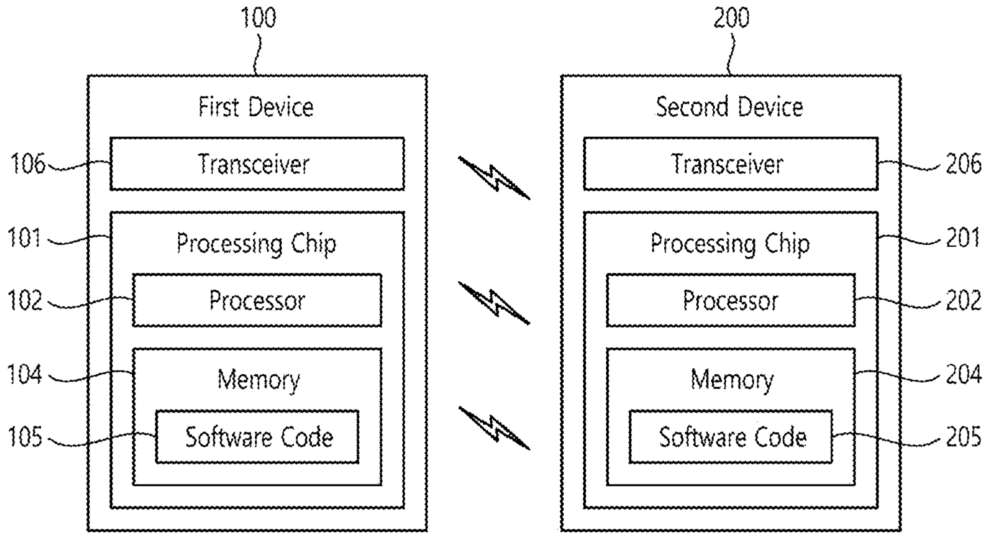
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
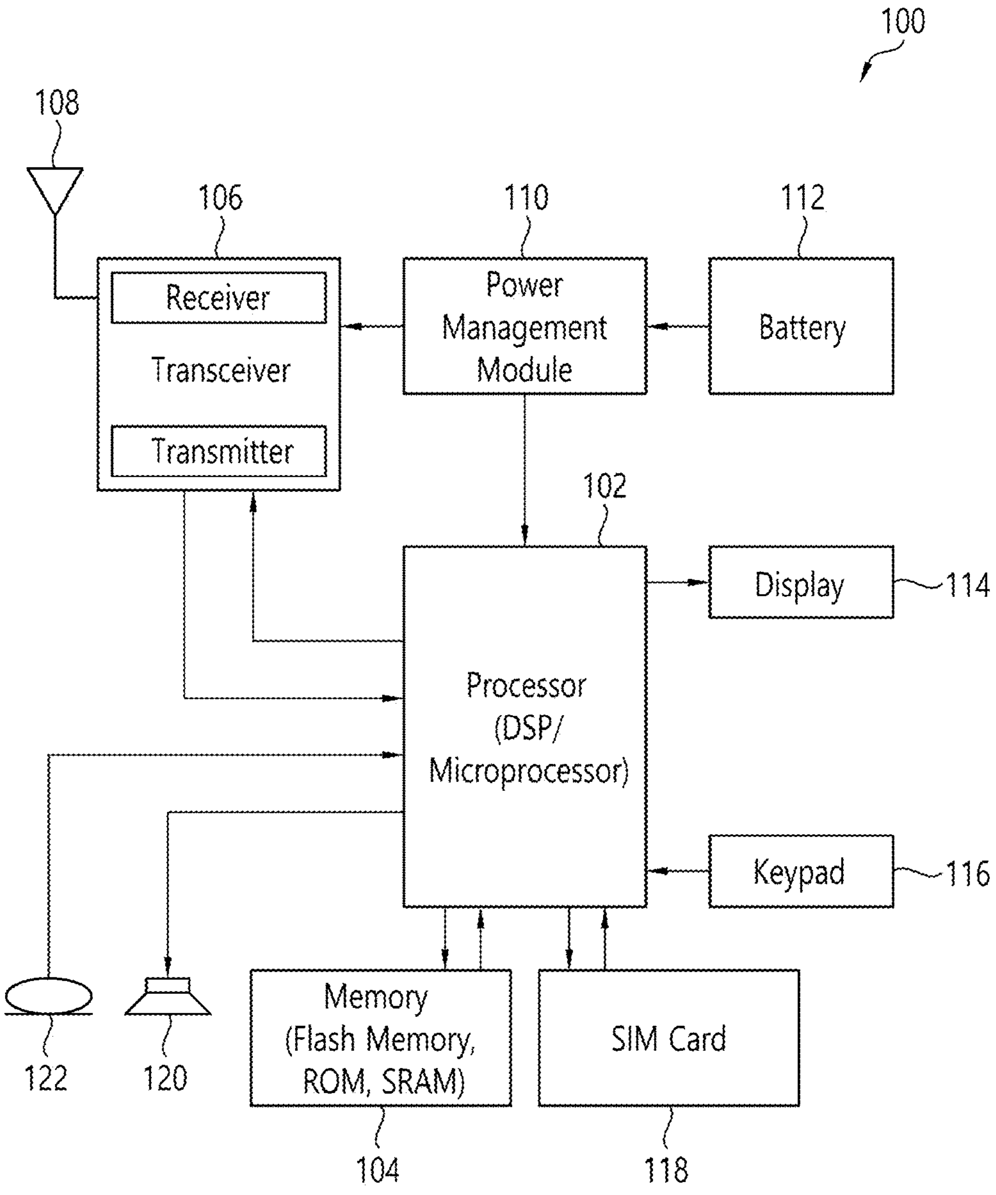
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
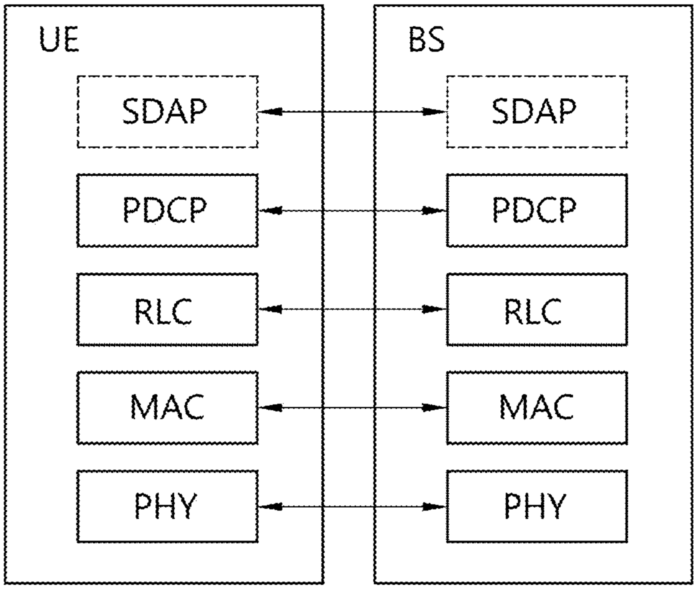
FIGS. 6 and 7 show an example of protocol stacks in a 3GPP based wireless communication system to which implementations of the present disclosure is applied.
Figure 7:
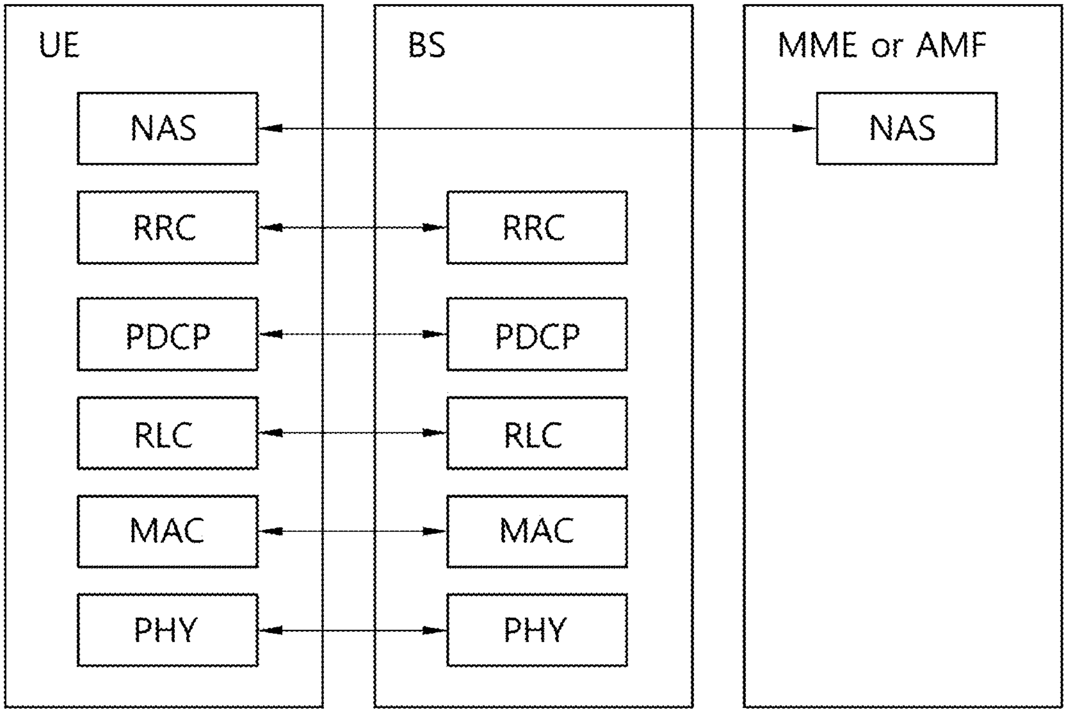

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QOS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
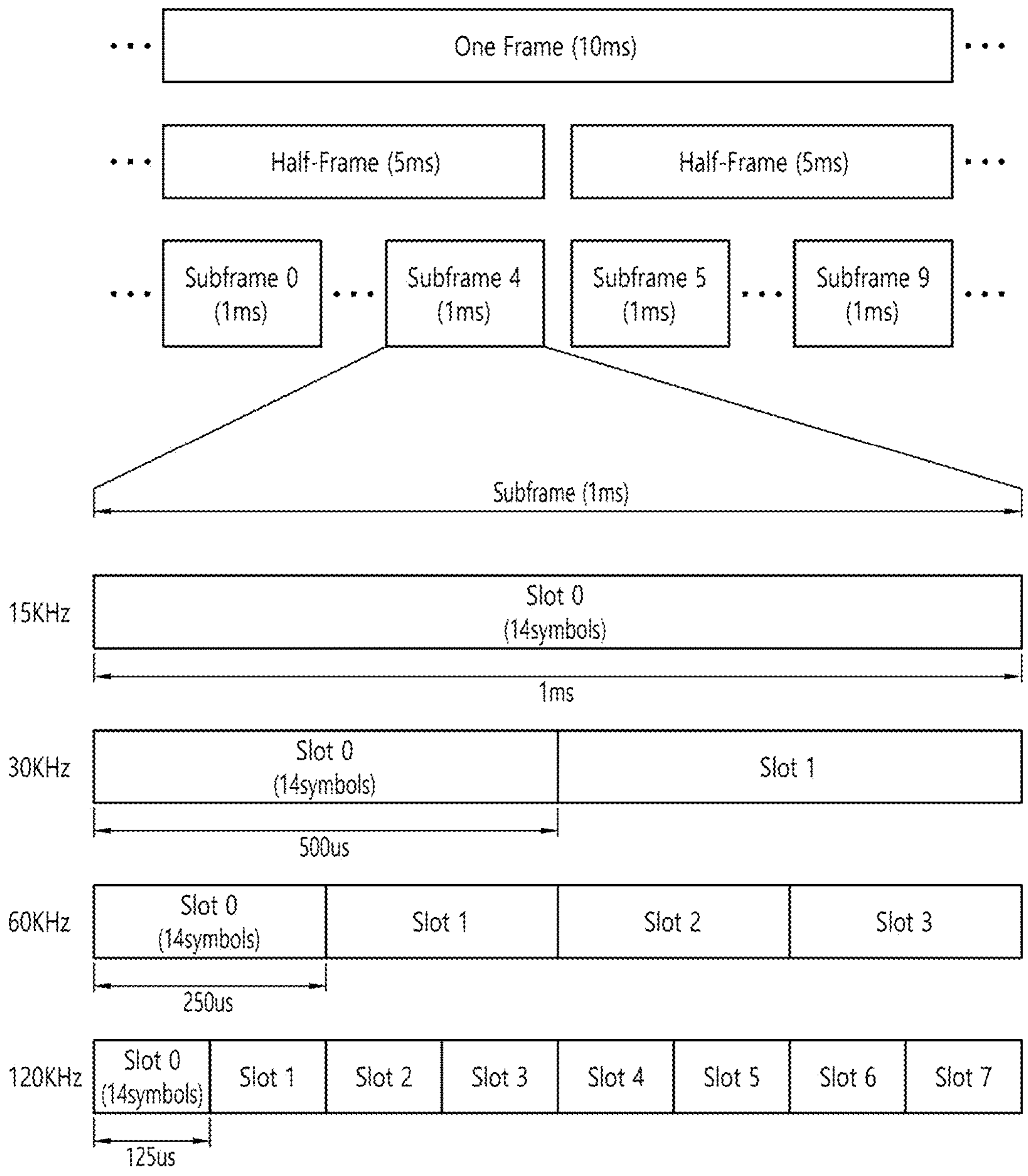
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean “sub 6 GHz range”, FR2 may mean “above 6 GHz range,” and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term “cell” may refer to a geographic area to which one or more nodes provide a communication system, or refer to radio resources. A “cell” as a geographic area may be understood as coverage within which a node can provide service using a carrier and a “cell” as radio resources (e.g., time-frequency resources) is associated with bandwidth which is a frequency range configured by the carrier. The “cell” associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the “cell” of radio resources used by the node. Accordingly, the term “cell” may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term “serving cells” is used to denote the set of cells comprised of the SpCell(s) and all SCells. In DC, two MAC entities are configured in a UE: one for the MCG and one for the SCG.

Figure 9:
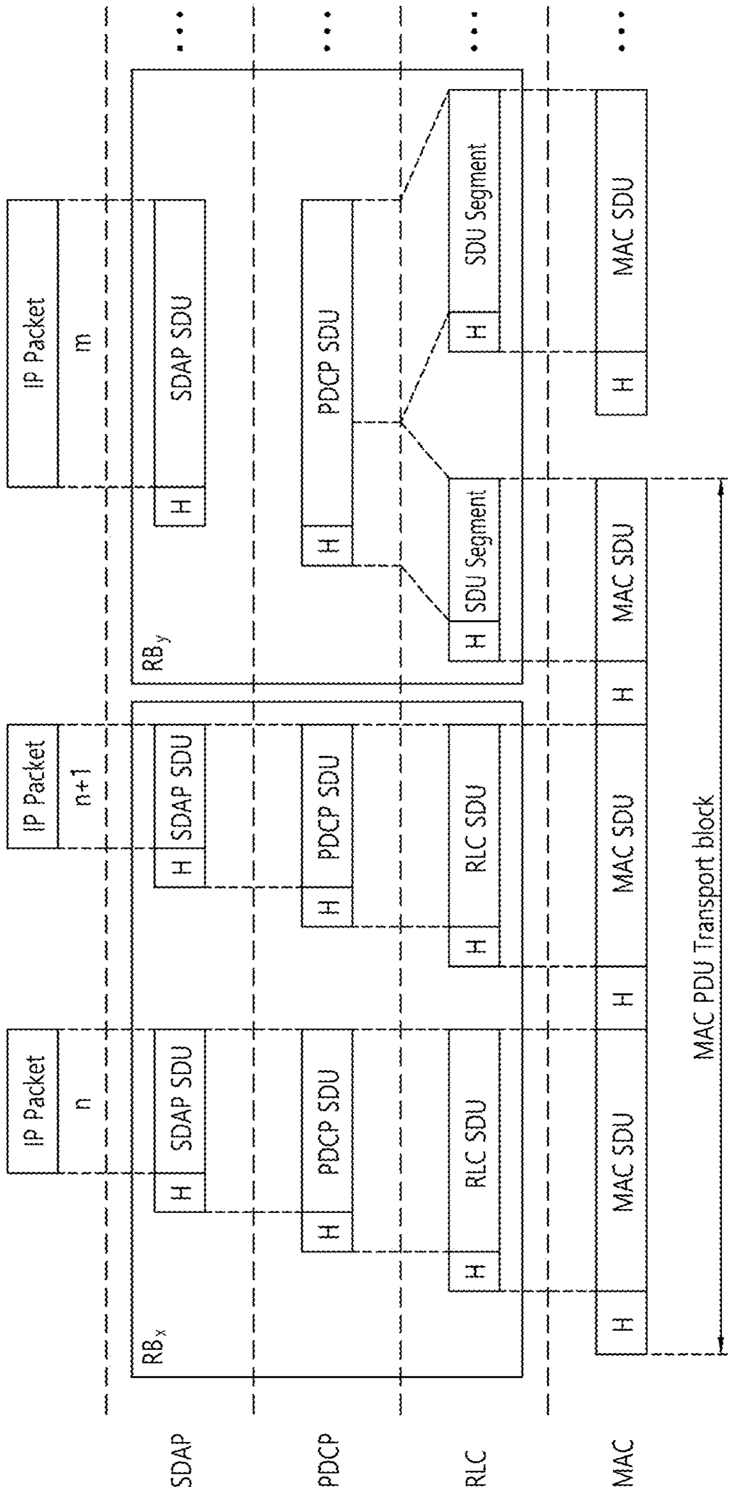
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, “RB” denotes a radio bearer, and “H” denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Figure 10:
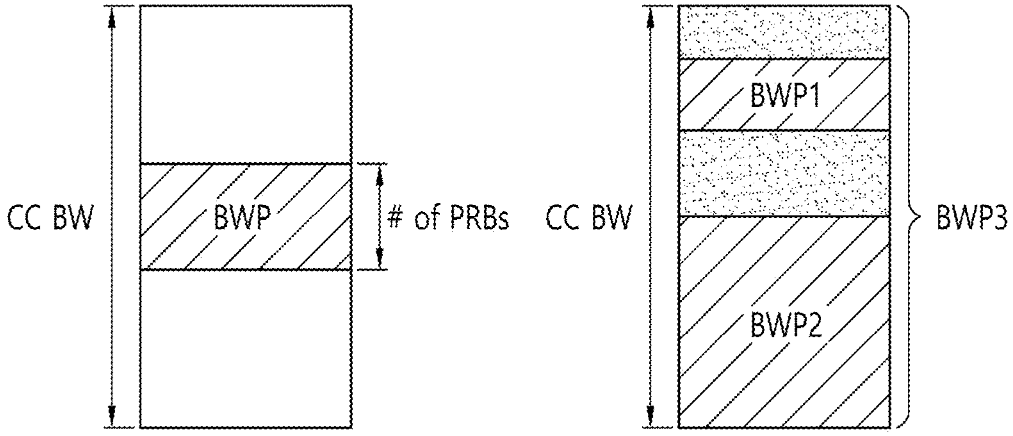
FIG. 10 shows an example of bandwidth part (BWP) configurations to which implementations of the present disclosure is applied.

FIG. 10 shows an example of bandwidth part (BWP) configurations to which implementations of the present disclosure is applied.

Referring to FIG. 10, BWP consists of a group of contiguous physical resource blocks (PRBs). The bandwidth (BW) of BWP cannot exceed the configured component carrier (CC) BW for the UE. The BW of the BWP must be at least as large as one synchronization signal (SS) block BW, but the BWP may or may not contain SS block. Each BWP is associated with a specific numerology, i.e., subcarrier spacing (SCS) and cyclic prefix (CP) type. Therefore, the BWP is also a means to reconfigure a UE with a certain numerology.

As illustrated in the right figure of FIG. 10, the network can configure multiple BWPs to a UE via radio resource control (RRC) signaling, which may overlap in frequency. The granularity of BWP configuration is one PRB. For each serving cell, DL and UL BWPs are configured separately and independently for paired spectrum and up to four BWPs can be configured for DL and UL each. For unpaired spectrum, a DL BWP and a UL BWP are jointly configured as a pair and up to 4 pairs can be configured. There can be maximally 4 UL BWPs configured for a supplemental UL (SUL) as well.

Figure 11:
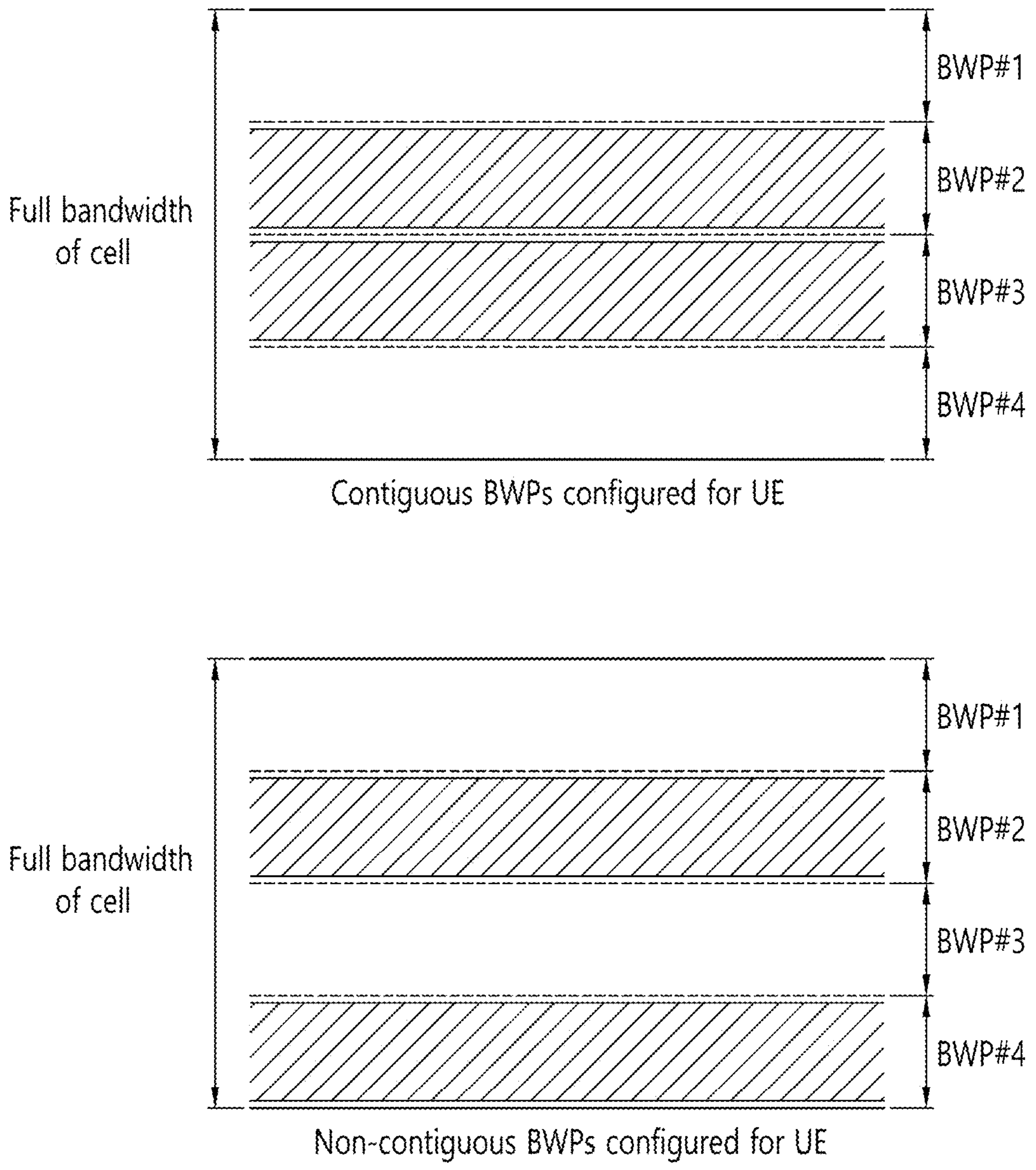
FIG. 11 shows an example of contiguous BWPs and non-contiguous BWPs to which implementations of the present disclosure is applied

FIG. 11 shows an example of contiguous BWPs and non-contiguous BWPs to which implementations of the present disclosure is applied Referring to FIG. 11, for serving cell measurements, a UE may be configured with multiple BWPs contiguously or non-contiguously. In order to derive quality of the serving cell, the UE measures only configured BWPs, not all BWPs that belongs to the serving cell.

Each configured DL BWP includes at least one control resource set (CORESET) with UE-specific search space (USS). The USS is a searching space for UE to monitor possible reception of control information destined for the UE. In the primary carrier, at least one of the configured DL BWPs includes one CORESET with common search space (CSS). The CSS is a searching space for UE to monitor possible reception of control information common for all UEs or destined for the particular UE. If the CORESET of an active DL BWP is not configured with CSS, the UE is not required to monitor it. Note that UEs are expected to receive and transmit only within the frequency range configured for the active BWPs with the associated numerologies. However, there are exceptions. A UE may perform Radio Resource Management (RRM) measurement or transmit sounding reference signal (SRS) outside of its active BWP via measurement gap.

Figure 12:
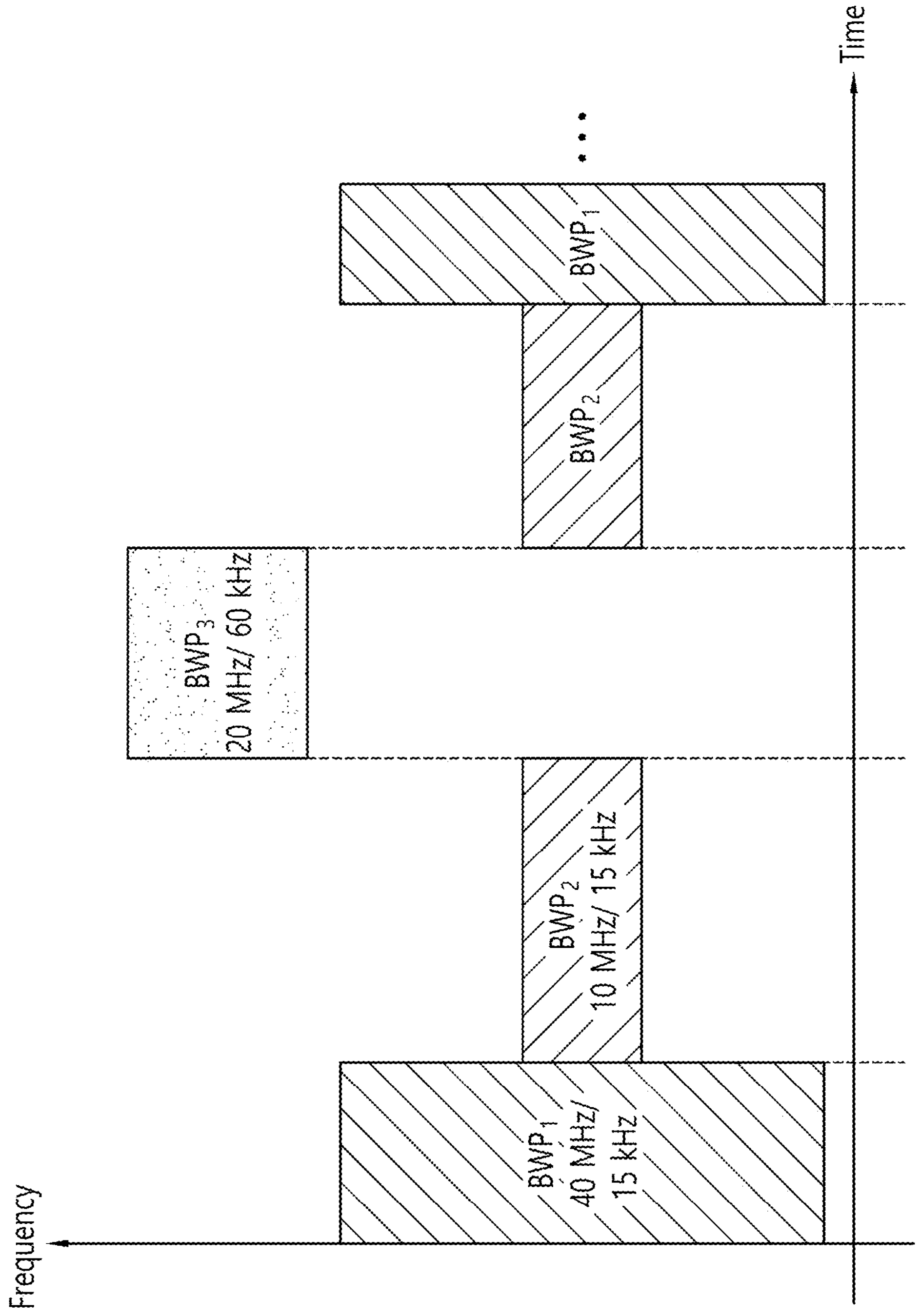
FIG. 12 shows an example of Bandwidth Adaptation to which implementations of the present disclosure is applied.

FIG. 12 shows an example of Bandwidth Adaptation to which implementations of the present disclosure is applied.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

FIG. 12 describes a scenario where 3 different BWPs are configured:

$BWP_1$ with a width of 40 MHz and subcarrier spacing of 15 kHz;

$BWP_2$ with a width of 10 MHz and subcarrier spacing of 15 kHz;

$BWP_3$ with a width of 20 MHz and subcarrier spacing of 60 kHz.

To enable BA on the PCell, the gNB configures the UE with UL and DL BWP(s). To enable BA on SCells in case of CA, the gNB configures the UE with DL BWP(s) at least (i.e. there may be none in the UL). For the PCell, the BWP used for initial access is configured via system information. For the SCell(s), the BWP used after initial activation is configured via dedicated RRC signaling.

In paired spectrum, DL and UL can switch BWP independently. In unpaired spectrum, DL and UL switch BWP simultaneously. Switching between configured BWPs happens by means of RRC signalling, DCI, inactivity timer or upon initiation of random access. When an inactivity timer is configured for a serving cell, the expiry of the inactivity timer associated to that cell switches the active BWP to a default BWP configured by the network. There can be at most one active BWP per cell, except when the serving cell is configured with SUL, in which case there can be at most one on each UL carrier.

Hereinafter, technical features related to Bandwidth part are described. Section 4.4.5 of 3GPP TS 38.211 v16.1.0 may be referred.

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Hereinafter, technical features related to Bandwidth Part (BWP) operation are described. Section 5.15 of 3GPP TS 38.321 v16.2.1 may be referred.

In particular, BWP operations related to Downlink and Uplink are described.

This clause specifies requirements on BWP operation.

A Serving Cell may be configured with one or multiple BWPs, and the maximum number of BWP per Serving Cell could be pre-determined.

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random Access procedure or upon detection of consistent LBT failure on SpCell. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL.

For each SCell a dormant BWP may be configured with dormantBWP-Id by RRC signalling. Entering or leaving dormant BWP for SCells is done by BWP switching per SCell or per dormancy SCell group based on instruction from PDCCH. The dormancy SCell group configurations are configured by RRC signalling. Upon reception of the PDCCH indicating leaving dormant BWP, the DL BWP indicated by firstOutsideActiveTimeBWP-Id or by firstWithinActiveTimeBWP-Id is activated. Upon reception of the PDCCH indicating entering dormant BWP, the DL BWP indicated by dormantBWP-Id is activated. The dormant BWP configuration for SpCell or PUCCH SCell is not supported.

For each activated Serving Cell configured with a BWP, the MAC entity shall:

1> if a BWP is activated and the active DL BWP for the Serving Cell is not the dormant BWP:

2> transmit on UL-SCH on the BWP;

2> transmit on RACH on the BWP, if PRACH occasions are configured;

2> monitor the PDCCH on the BWP;

2> transmit PUCCH on the BWP, if configured;

2> report CSI for the BWP;

2> transmit SRS on the BWP, if configured;

2> receive DL-SCH on the BWP;

2> (re-)initialize any suspended configured uplink grants of configured grant Type 1 on the active BWP according to the stored configuration, if any, and to start in the symbol;

2> if lbt-FailureRecoveryConfig is configured;

3> stop the lbt-FailureDetectionTimer, if running;

3> set LBT COUNTER to 0;

3> monitor LBT failure indications from lower layers.

1> if a BWP is activated and the active DL BWP for the Serving Cell is dormant BWP:

2> stop the bwp-InactivityTimer of this Serving Cell, if running.

2> not monitor the PDCCH on the BWP;

2> not monitor the PDCCH for the BWP;

2> not receive DL-SCH on the BWP;

2> not report CSI on the BWP, report CSI except aperiodic CSI for the BWP;

2> not transmit SRS on the BWP;

2> not transmit on UL-SCH on the BWP;

2> not transmit on RACH on the BWP;

2> not transmit PUCCH on the BWP.

2> clear any configured downlink assignment and any configured uplink grant Type 2 associated with the SCell respectively;

2> suspend any configured uplink grant Type 1 associated with the SCell;

2> if configured, perform beam failure detection and beam failure recovery for the SCell if beam failure is detected.

1> if a BWP is deactivated:

2> not transmit on UL-SCH on the BWP;

2> not transmit on RACH on the BWP;

2> not monitor the PDCCH on the BWP;

2> not transmit PUCCH on the BWP;

2> not report CSI for the BWP;

2> not transmit SRS on the BWP;

2> not receive DL-SCH on the BWP;

2> clear any configured downlink assignment and configured uplink grant of configured grant Type 2 on the BWP;

2> suspend any configured uplink grant of configured grant Type 1 on the inactive BWP.

Upon initiation of the Random Access procedure on a Serving Cell, after the selection of carrier for performing Random Access procedure, the MAC entity shall for the selected carrier of this Serving Cell:

1> if PRACH occasions are not configured for the active UL BWP:

2> switch the active UL BWP to BWP indicated by initialUplinkBWP;

2> if the Serving Cell is an SpCell:

3> switch the active DL BWP to BWP indicated by initialDownlinkBWP.

1> else:

2> if the Serving Cell is an SpCell:

3> if the active DL BWP does not have the same bwp-Id as the active UL BWP:

4> switch the active DL BWP to the DL BWP with the same bwp-Id as the active UL BWP.

1> stop the bwp-InactivityTimer associated with the active DL BWP of this Serving Cell, if running.

1> if the Serving Cell is SCell:

2> stop the bwp-InactivityTimer associated with the active DL BWP of SpCell, if running.

1> perform the Random Access procedure on the active DL BWP of SpCell and active UL BWP of this Serving Cell.

If the MAC entity receives a PDCCH for BWP switching of a Serving Cell, the MAC entity shall:

1> if there is no ongoing Random Access procedure associated with this Serving Cell; or 1> if the ongoing Random Access procedure associated with this Serving Cell is successfully completed upon reception of this PDCCH addressed to C-RNTI:

2> cancel, if any, triggered consistent LBT failure for this Serving Cell;

2> perform BWP switching to a BWP indicated by the PDCCH.

If the MAC entity receives a PDCCH for BWP switching for a Serving Cell(s) or a dormancy SCell group(s) while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the Serving Cell.

Upon reception of RRC (re-)configuration for BWP switching for a Serving Cell while a Random Access procedure associated with that Serving Cell is ongoing in the MAC entity, the MAC entity shall stop the ongoing Random Access procedure and initiate a Random Access procedure after performing the BWP switching.

Upon reception of RRC (re-)configuration for BWP switching for a Serving Cell, cancel any triggered LBT failure in this Serving Cell.

The MAC entity shall for each activated Serving Cell configured with bwp-InactivityTimer:

1> if the defaultDownlinkBWP-Id is configured, and the active DL BWP is not the BWP indicated by the defaultDownlinkBWP-Id, and the active DL BWP is not the BWP indicated by the dormantBWP-Id if configured; or 1> if the defaultDownlinkBWP-Id is not configured, and the active DL BWP is not the initialDownlinkBWP, and the active DL BWP is not the BWP indicated by the dormantBWP-Id if configured:

2> if a PDCCH addressed to C-RNTI or CS-RNTI indicating downlink assignment or uplink grant is received on the active BWP; or 2> if a PDCCH addressed to C-RNTI or CS-RNTI indicating downlink assignment or uplink grant is received for the active BWP; or 2> if a MAC PDU is transmitted in a configured uplink grant and LBT failure indication is not received from lower layers; or 2> if a MAC PDU is received in a configured downlink assignment:

3> if there is no ongoing Random Access procedure associated with this Serving Cell; or 3> if the ongoing Random Access procedure associated with this Serving Cell is successfully completed upon reception of this PDCCH addressed to C-RNTI:

4> start or restart the bwp-InactivityTimer associated with the active DL BWP.

2> if the bwp-InactivityTimer associated with the active DL BWP expires:

3> if the defaultDownlinkBWP-Id is configured:

4> perform BWP switching to a BWP indicated by the defaultDownlinkBWP-Id.

3> else:

4> perform BWP switching to the initialDownlinkBWP.

If a Random Access procedure is initiated on an SCell, both this SCell and the SpCell are associated with this Random Access procedure.

1> if a PDCCH for BWP switching is received, and the MAC entity switches the active DL BWP:

2> if the defaultDownlinkBWP-Id is configured, and the MAC entity switches to the DL BWP which is not indicated by the defaultDownlinkBWP-Id and is not indicated by the dormantBWP-Id if configured; or 2> if the defaultDownlinkBWP-Id is not configured, and the MAC entity switches to the DL BWP which is not the initialDownlinkBWP and is not indicated by the dormantBWP-Id if configured:

3> start or restart the bwp-InactivityTimer associated with the active DL BWP.

Hereinafter, technical features related to paging are described.

Figure 13:
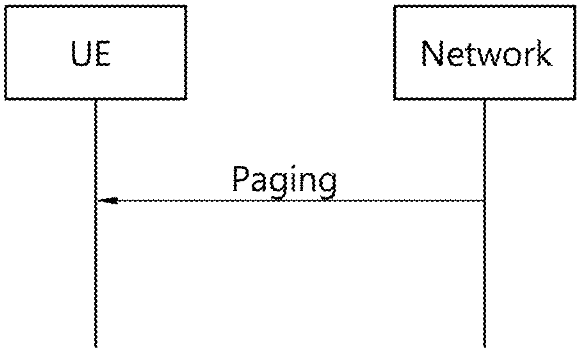
FIG. 13 shows an example of paging.

FIG. 13 shows an example of paging.

The purpose of this procedure is:

to transmit paging information to a UE in RRC_IDLE or RRC_INACTIVE.

The network initiates the paging procedure by transmitting the Paging message at the UE's paging occasion. The network may address multiple UEs within a Paging message by including one PagingRecord for each UE.

Reception of the Paging message by the UE

Upon receiving the Paging message, the UE shall:

1> if in RRC_IDLE, for each of the PagingRecord, if any, included in the Paging message:

2> if the ue-Identity included in the PagingRecord matches the UE identity allocated by upper layers:

3> forward the ue-Identity and accessType (if present) to the upper layers;

1> if in RRC_INACTIVE, for each of the PagingRecord, if any, included in the Paging message:

2> if the ue-Identity included in the PagingRecord matches the UE's stored fullI-RNTI:

3> if the UE is configured by upper layers with Access Identity 1:

4> initiate the RRC connection resumption procedure with resumeCause set to mps-PriorityAccess;

3> else if the UE is configured by upper layers with Access Identity 2:

4> initiate the RRC connection resumption procedure with resumeCause set to mcs-PriorityAccess;

3> else if the UE is configured by upper layers with one or more Access Identities equal to 11-15:

4> initiate the RRC connection resumption procedure with resumeCause set to highPriorityAccess;

3> else:

4> initiate the RRC connection resumption procedure with resumeCause set to mt-Access;

2> else if the ue-Identity included in the PagingRecord matches the UE identity allocated by upper layers:

3> forward the ue-Identity to upper layers and accessType (if present) to the upper layers;

3> perform the actions upon going to RRC_IDLE with release cause 'other'.

Hereinafter, an example of paging is described. The Paging message is used for the notification of one or more UEs. Technical features related to the paging message are as below.

Signalling radio bearer: N/A

RLC-SAP: TM

Logical channel: PCCH

Direction: Network to UE

For example, a paging message may include an accessType. The accessType may indicate whether the Paging message is originated due to the PDU sessions from the non-3GPP access.

Hereinafter, technical features related to multicast session are described.

For example, in NR, a multicast broadcast service (MBS) may be supported. A wireless device may be able to receive a multicast service in RRC_CONNECTED. A wireless device may join a multicast session in RRC_CONNECTED. When the multicast session is deactivated or inactivated, the wireless device may enter RRC_IDLE or RRC_INACTIVE. When the multicast session is activated, the wireless device could receive the multicast service by entering RRC_CONNECTED.

For the multicast session, the following states were defined:

Active multicast session: Established multicast session in active state. Multicast data are transmitted to UEs that joined the multicast session. 5GC resources for the multicast session are reserved. Corresponding Radio resources are reserved depending on participating UE locations. UEs that joined the multicast session are in CM CONNECTED state. UEs are allowed to join the multicast session (subject to authorization check).

Inactive multicast session: Established multicast session in inactive state. No multicast data are transmitted. UEs that joined the multicast session may be in CM CONNECTED or CM IDLE state. UEs are allowed to join the multicast session (subject to authorization check).

For broadcast, only session start/stop are applicable.

It is necessary for UE to receive the MBS Session activation notification (e.g., legacy paging) when it is served by a non-supporting NG-RAN node.

It is beneficial, e.g. for signalling efficiency, to support 5GC requesting NG-RAN nodes to notify session activation of an MBS session to UEs based on MBS session ID, at least to NG-RAN nodes supporting MBS.

To page UEs in RRC_IDLE/INACTIVE that are interested to receive a multicast service, group paging (that is, a paging message including a multicast service identifier, for example, an MBS Session activation notification) can be used. If the multicast service identifier of the interested multicast service is included in the received paging message, UE may initiate RRC connection establishment procedure, to receive the multicast service of interest in RRC_CONNECTED.

Meanwhile, the group paging may be used to simultaneously page numerous UEs in RRC_IDLE/INACTIVE, which are interested in the same multicast session. If UE receives the group paging including an identity of the multicast session of interest, the UE may enter RRC_CONNECTED to receive the multicast session.

Since the multicast session is transmitted using a certain bandwidth part, though the transition to RRC_CONNECTED is complete, UE cannot receive the multicast session of interest until the network command is received, that indicates BWP switching to the certain BWP.

Considering that numerous UEs simultaneously enter RRC_CONNECTED to receive the same multicast session, the network may spend a huge radio resource to command each UE using dedicated radio resource to switch the active BWP to the certain BWP. Thus, the switching command may be delayed for some UEs.

Therefore, studies for bandwidth part switching for a multicast session in a wireless communication system are required.

Hereinafter, a method for bandwidth part switching for a multicast session in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 14:
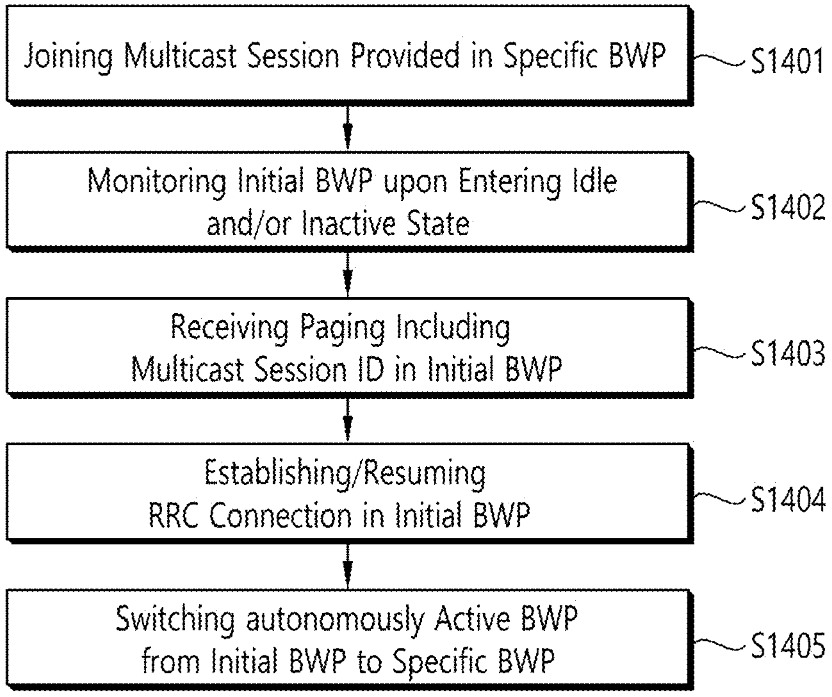
FIG. 14 shows an example of a method for bandwidth part switching for a multicast session in a wireless communication system, according to some embodiments of the present disclosure.

FIG. 14 shows an example of a method for bandwidth part switching for a multicast session in a wireless communication system, according to some embodiments of the present disclosure.

In particular, FIG. 14 shows an example of a method performed by a wireless device in a wireless communication system.

In step S1401, a wireless device may join a multicast session provided in a specific bandwidth part (BWP).

For example, the wireless device may acquire information on the specific BWP while in a connected state after joining the multicast session. For example, the network may provide the information on the specific BWP.

For example, the specific BWP may include common frequency resources (CFR) for the multicast session. In other words, the multicast service may be provided on the CFR based on the multicast session. Then, the specific BWP may include a bandwidth range that covers the CFR.

Alternatively, the multicast session may be provided in the CFR, and the specific BWP may mean the CFR. That is, the specific BWP may be used as a term to indicate CFR.

For example, the wireless device may support a single active bandwidth part. That is, the wireless device may configure a plurality of BWPs (for example, 4 BWPs) and activate only one BWP among the plurality of BWPs.

After joining the multicast session, the wireless device may receive a multicast service based on the multicast session before entering the idle and/or inactive state, as in step S1402. For example, the wireless device may activate the specific BWP and receive a multicast service provided in the specific BWP while in RRC_CONNECTED state.

For example, the wireless device may receive, from a network, an activation command or a command for BWP switching for the MBS session. Then, the wireless device may perform BWP switching from an initial BWP to the specific BWP to receive the multicast service.

In step S1402, a wireless device may monitor an initial BWP upon entering an idle and/or inactive state.

For example, the network may pause to provide the multicast service (or multicast session). In this case, the wireless device may enter into the RRC_IDLE and/or RRC_INACTIVE state. When the wireless device enters into the RRC_IDLE and/or RRC_INACTIVE state, the wireless device may perform the BWP switching to the initial BWP. In other words, in the RRC_IDLE and/or RRC_INACTIVE state, the wireless device may monitor the initial BWP while in the RRC_IDLE and/or RRC_INACTIVE.

In step S1403, a wireless device may receive a paging in the initial BWP. The paging may include a multicast session identity (ID) for the multicast session.

For example, the network (for example, 5GC, EPC, eNB, or gNB) may provide a paging (for example, a group paging) including information on a multicast session for one or more wireless devices (for example, UEs) which want to receive the multicast session.

For example, the paging may only include the multicast session ID, but may not include an identity of the wireless device. Then, the wireless device may enter into RRC_CONNECTED to receive the multicast service or the multicast session, even though the paging does not include the ID of the wireless device.

In step S1404, a wireless device may establish and/or resume a radio resource control (RRC) connection in the initial BWP as an active BWP.

That is, since the wireless device detects the multicast session ID in the paging, the wireless device may establish and/or resume the RRC connection in order to receive the multicast service or the multicast session. In this case, the wireless device may establish and/or resume the RRC connection in the initial BWP as an active BWP. That is, the wireless device may activate the initial BWP when entering into the RRC_CONNECTED.

In step S1405, a wireless device may switch autonomously the active BWP from the initial BWP to the specific BWP.

For example, the wireless device may activate the specific BWP, and deactivate the initial BWP.

The multicast session is provided in the specific BWP. Thus, the wireless device could not receive the multicast session while the initial BWP is activated. Therefore, the wireless device may need to switch the active BWP from the initial BWP to the specific BWP to receive the multicast session or the multicast service.

Since the wireless device autonomously switches the active BWP from the initial BWP to the specific BWP after establishing and/or resuming the RRC connection (or upon establishing and/or resuming the RRC connection), the wireless device could receive the multicast session and/or the multicast service without receiving a BWP switching command from the network.

In other words, the wireless device may switch autonomously the active BWP from the initial BWP to the specific BWP without a command for BWP switching from a network. That is, the wireless device may switch autonomously the active BWP from the initial BWP to the specific BWP without monitoring and/or receiving the command for BWP switching from a network.

According to some embodiment of the present disclosure, the paging may include an autonomous switching indication informing whether the wireless device is able to autonomously switch the active BWP. The autonomous switching indication may be configured per multicast session. For example, a single autonomous switching indication for a single multicast session may be an 1-bit information.

For example, the paging may include (1) a multicast session ID for a first multicast session, (2) a multicast session ID for a second multicast session, (3) a first autonomous switching indication for the first multicast session, and (4) a second autonomous switching indication for the second multicast session.

It may be assumed that a first wireless device has joined a first multicast session and a second wireless device has joined a second multicast session. In addition, it may be assumed that the first autonomous switching indication is set to TRUE and the second autonomous switching indication is set to FALSE.

When the first wireless device receives the paging, the first wireless device may perform the autonomous BWP switching to a specific BWP providing the first multicast session, upon entering into the RRC_CONNECTED. Thus, the first wireless device could receive the multicast session, immediately.

However, when the second wireless device receives the paging the second wireless device the second wireless device could not perform the autonomous BWP switching and need to wait the BWP switching command from the network. In this case, the second wireless device could receive the multicast session after receiving the BWP switching command.

According to some embodiments of the present disclosure, the wireless device may be in communication with at least one of a user equipment, a network, or an autonomous vehicle other than the wireless device.

Hereinafter, an example, of a method for bandwidth part switching for a multicast session in a wireless communication system, according to some embodiments of the present disclosure.

According to some embodiments of the present disclosure, UE may autonomously activate a bandwidth part where the multicast session of interest is transmitted upon entering RRC_CONNECTED, if the RRC connection establishment is initiated by receiving the group paging.

Autonomous Activation of Bandwidth Part

If UE supports a single active bandwidth part, UE may deactivate a current active BWP to activate another BWP. When UE enters RRC_CONNECTED, the active BWP may be an initial BWP. In this disclosure, UE may switch the active BWP from the initial BWP to a BWP where the multicast session of interest is being provided without network command for active BWP switching.

Bandwidth Part Where the Multicast Session of Interest is Transmitted

UE may acquire the bandwidth part information for multicast session of interest while in RRC_CONNECTED. After leaving the RRC_CONNECTED, UE may maintain the bandwidth part information so that the UE can autonomously activate the bandwidth part upon entering RRC_CONNECTED.

The bandwidth part that the UE can autonomously activate can be indicated in the group paging. In this case, if the RRC connection establishment is triggered by receiving a group paging, UE may perform BWP switching to a bandwidth part which is indicated in the received group paging upon entering RRC_CONNECTED. When multiple multicast sessions are indicated in a group paging, the bandwidth part indication may be provided per multicast session.

Multicast Session of Interest

If UE has joined a multicast session, the UE may consider the multicast session is a multicast session of interest.

If UE is receiving a multicast session, the UE may consider the multicast session is a multicast session of interest.

If UE wants to receive a multicast session, the UE may consider the multicast session is a multicast session of interest.

Autonomous Switching Indication

In the group paging, an indication can be included which indicates whether UE can autonomously switch the active BWP or not. The indication may be per multicast session.

For example, it may be assumed that the indication is set to TRUE for multicast session A, and the indication is set to FALSE for multicast session B. In this case, UE1 and UE2 have joined multicast session A and B, respectively. Then, UE1 may autonomously change the active BWP upon entering RRC_CONNECTED, but UE2 may not perform the autonomous active BWP switching.

Figure 15:
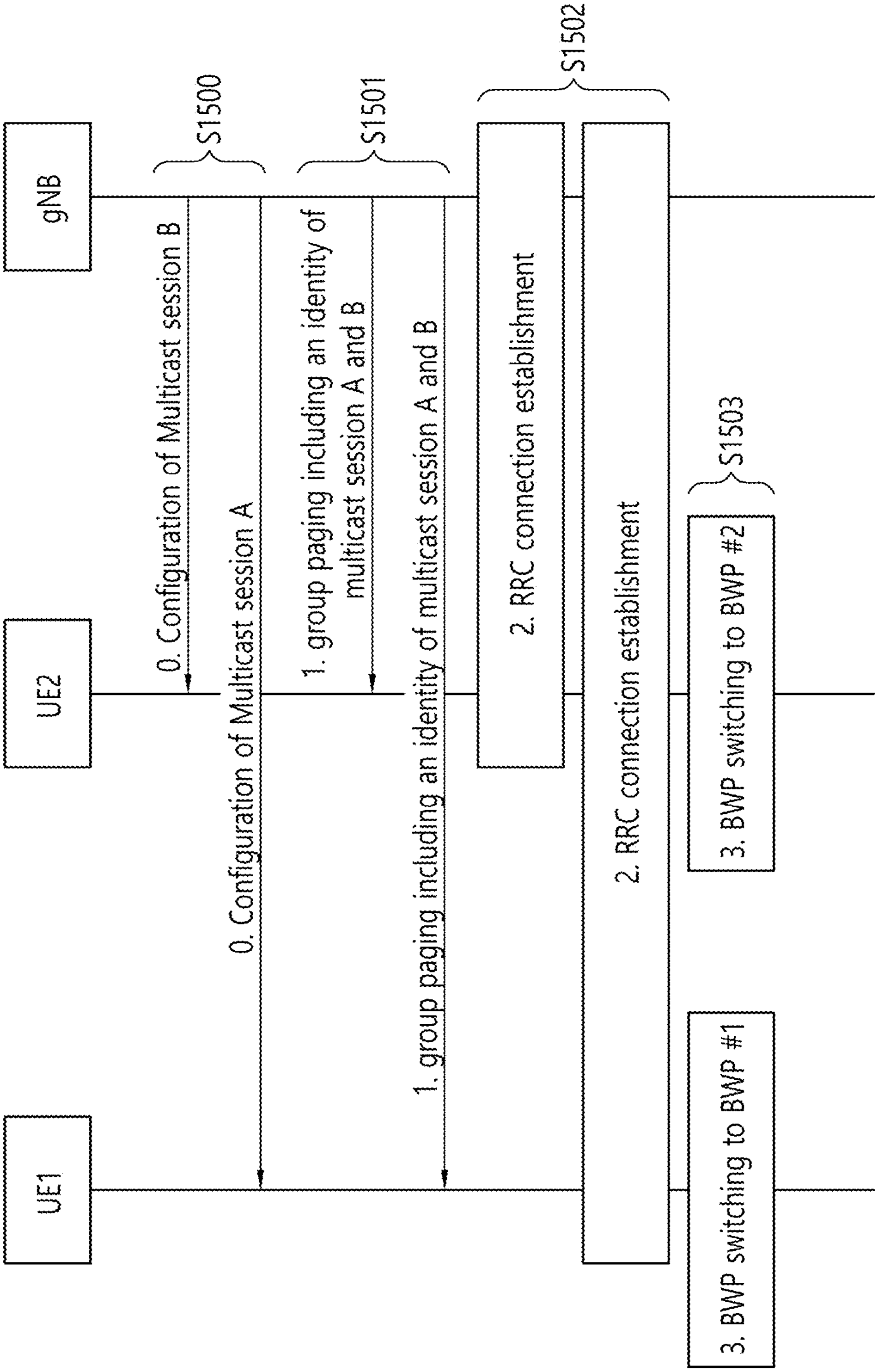
FIG. 15 shows an example of a method for bandwidth part switching for a multicast session in a wireless communication system, according to some embodiments of the present disclosure.

FIG. 15 shows an example of a method for bandwidth part switching for a multicast session in a wireless communication system, according to some embodiments of the present disclosure.

Referring to FIG. 15, in step S1500, UE1 and UE2 may be interested in multicast session A and B, respectively. UE1 and UE2 may receive the multicast configuration for the multicast session of interest. The multicast configuration may include BWP information. According to the multicast configuration, multicast session A may be provided on BWP #1 and the multicast session B may be provided on BWP #2.

In step S1501, UE1 and UE2 may receive a group paging from a serving cell, which includes two multicast session information, that is, multicast session A and B.

In step S1502, UE1 may establish RRC connection to receive the multicast session A and UE2 may establish RRC connection to receive the multicast session B.

In step S1503, upon entering RRC_CONNECTED, UE1 may perform BWP switching to BWP #1. In addition, upon entering RRC_CONNECTED, UE2 may perform BWP switching to BWP #2.

Figure 16:
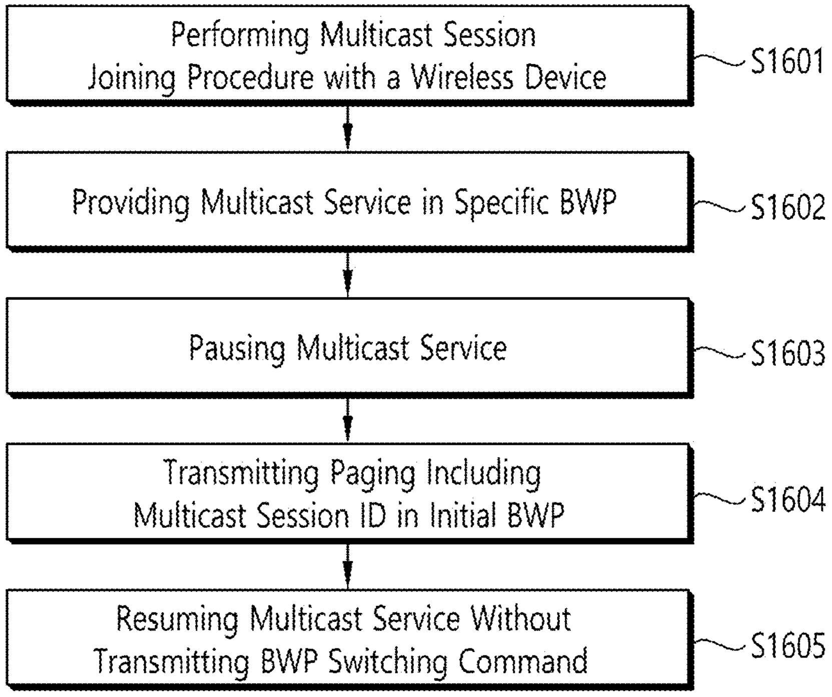
FIG. 16 shows an example of Base Station (BS) operations for bandwidth part switching for a multicast session in a wireless communication system, according to some embodiments of the present disclosure.

FIG. 16 shows an example of Base Station (BS) operations for bandwidth part switching for a multicast session in a wireless communication system, according to some embodiments of the present disclosure.

In step S1601, a BS may perform a multicast session joining procedure with a wireless device.

In step S1602, a BS may provide, to the wireless device, a multicast service based on a multicast session in a specific bandwidth part (BWP).

In step S1603, a BS may pause to provide the multicast service.

In step S1604, a BS may transmit, to the wireless device, a paging in an initial BWP. The paging may include a multicast session identity (ID) for the multicast session.

In step S1605, a BS may resume to provide the multicast service to the wireless device without transmitting a BWP switching command.

Some of the detailed steps shown in the examples of FIGS. 14, 15, and 16 may not be essential steps and may be omitted. In addition to the steps shown in FIGS. 14, 15, and 16, other steps may be added, and the order of the steps may vary. Some of the above steps may have their own technical meaning.

Hereinafter, an apparatus for bandwidth part switching for a multicast session in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to join a multicast session provided in a specific bandwidth part (BWP). The processor 102 may be configured to monitor an initial BWP upon entering an idle and/or inactive state. The processor 102 may be configured to control the transceiver 106 to receive a paging in the initial BWP, wherein the paging includes a multicast session identity (ID) for the multicast session. The processor 102 may be configured to establish and/or resuming a radio resource control (RRC) connection in the initial BWP as an active BWP. The processor 102 may be configured to switch autonomously the active BWP from the initial BWP to the specific BWP.

For example, the paging includes an autonomous switching indication informing that the wireless device is able to autonomously switch the active BWP.

For example, the autonomous switching indication is configured per multicast session.

For example, the processor 102 may be configured to switch autonomously the active BWP from the initial BWP to the specific BWP without a command for BWP switching from a network.

For example, the processor 102 may be configured to activate the specific BWP, and deactivate the initial BWP.

For example, the specific BWP includes common frequency resources (CFR) for the multicast session.

For example, the processor 102 may be configured to control the transceiver 106 to receive a multicast service based on the multicast session before entering the idle and/or inactive state.

For example, the paging does not include an identity (ID) of the wireless device.

For example, the wireless device supports a single active bandwidth part.

For example, the processor 102 may be configured to acquire information on the specific BWP while in a connected state.

For example, the processor 102 may be configured to control the transceiver 106 to be in communication with at least one of a user equipment, a network, or an autonomous vehicle other than the wireless device.

Hereinafter, a processor for a wireless device for bandwidth part switching for a multicast session in a wireless communication system, according to some embodiments of the present disclosure, will be described.

The processor may be configured to control the wireless device to join a multicast session provided in a specific bandwidth part (BWP). The processor may be configured to control the wireless device to monitor an initial BWP upon entering an idle and/or inactive state. The processor may be configured to control the wireless device to receive a paging in the initial BWP, wherein the paging includes a multicast session identity (ID) for the multicast session. The processor may be configured to control the wireless device to establish and/or resuming a radio resource control (RRC) connection in the initial BWP as an active BWP. The processor may be configured to control the wireless device to switch autonomously the active BWP from the initial BWP to the specific BWP.

For example, the paging includes an autonomous switching indication informing that the wireless device is able to autonomously switch the active BWP.

For example, the autonomous switching indication is configured per multicast session.

For example, the processor may be configured to control the wireless device to switch autonomously the active BWP from the initial BWP to the specific BWP without a command for BWP switching from a network.

For example, the processor may be configured to control the wireless device to activate the specific BWP, and deactivate the initial BWP.

For example, the specific BWP includes common frequency resources (CFR) for the multicast session.

For example, the processor may be configured to control the wireless device to receive a multicast service based on the multicast session before entering the idle and/or inactive state.

For example, the paging does not include an identity (ID) of the wireless device.

For example, the wireless device supports a single active bandwidth part.

For example, the processor may be configured to control the wireless device to acquire information on the specific BWP while in a connected state.

For example, the processor may be configured to control the wireless device to be in communication with at least one of a user equipment, a network, or an autonomous vehicle other than the wireless device.

Hereinafter, a non-transitory computer-readable medium has stored thereon a plurality of instructions for bandwidth part switching for a multicast session in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to join a multicast session provided in a specific bandwidth part (BWP). The stored a plurality of instructions may cause the wireless device to monitor an initial BWP upon entering an idle and/or inactive state. The stored a plurality of instructions may cause the wireless device to receive a paging in the initial BWP, wherein the paging includes a multicast session identity (ID) for the multicast session. The stored a plurality of instructions may cause the wireless device to establish and/or resuming a radio resource control (RRC) connection in the initial BWP as an active BWP. The stored a plurality of instructions may cause the wireless device to switch autonomously the active BWP from the initial BWP to the specific BWP.

For example, the paging includes an autonomous switching indication informing that the wireless device is able to autonomously switch the active BWP.

For example, the autonomous switching indication is configured per multicast session.

For example, the stored a plurality of instructions may cause the wireless device to switch autonomously the active BWP from the initial BWP to the specific BWP without a command for BWP switching from a network.

For example, the stored a plurality of instructions may cause the wireless device to activate the specific BWP, and deactivate the initial BWP.

For example, the specific BWP includes common frequency resources (CFR) for the multicast session.

For example, the stored a plurality of instructions may cause the wireless device to receive a multicast service based on the multicast session before entering the idle and/or inactive state.

For example, the paging does not include an identity (ID) of the wireless device.

For example, the wireless device supports a single active bandwidth part.

For example, the stored a plurality of instructions may cause the wireless device to acquire information on the specific BWP while in a connected state.

For example, the stored a plurality of instructions may cause the wireless device to be in communication with at least one of a user equipment, a network, or an autonomous vehicle other than the wireless device.

According to some embodiments of the present disclosure, the stored a plurality of instructions may cause the wireless device to be in communication with at least one of a user equipment, a network, or an autonomous vehicle other than the wireless device.

Hereinafter, a base station (BS) for bandwidth part switching for a multicast session in a wireless communication system, according to some embodiments of the present disclosure, will be described.

The BS may include a transceiver, a memory, and a processor operatively coupled to the transceiver and the memory.

The processor may be configured to perform a multicast session joining procedure with a wireless device. The processor may be configured to control the transceiver to provide, to the wireless device, a multicast service based on a multicast session in a specific bandwidth part (BWP). The processor may be configured to pause to provide the multicast service. The processor may be configured to control the transceiver to transmit, to the wireless device, a paging in an initial BWP, wherein the paging includes a multicast session identity (ID) for the multicast session. The processor may be configured to control the transceiver to resume to provide the multicast service to the wireless device without transmitting a BWP switching command.

The present disclosure can have various advantageous effects.

According to some embodiments of the present disclosure, a wireless device could efficiently perform the bandwidth part (BWP) switching for a multicast session of interest.

For example, a wireless network could save the resource for the BWP switching for the multicast session of interest. That is, since the wireless device perform the BWP switching for a multicast session without a BWP switching command from the network, the wireless network could save the resources for the BWP switching command.

In other words, after transmitting a group paging, the network may not need to command the BWP switching using dedicated signalling to all UEs which enters RRC_CONNECTED simultaneously.

Thus, UE may not need to wait the network command to receive the multicast session of interest, and can immediately receive the multicast session upon entering RRC_CONNECTED.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method comprising:

joining, by a wireless device, a multicast session, wherein the multicast session is provided in a specific bandwidth part;

entering, by the wireless device, a radio resource control idle state or a radio resource control inactive state;

monitoring, by the wireless device, an initial bandwidth part upon entering the radio resource control idle state or the radio resource control inactive state;

receiving, by the wireless device, a paging including a multicast session identity for the multicast session, wherein the paging is transmitted within the initial bandwidth part;

entering, by the wireless device, a radio resource control connected state based on the initial bandwidth part; and performing, by the wireless device, an autonomous bandwidth part switching to receive the multicast session by activating the specific bandwidth part and deactivating the initial bandwidth part upon entering the radio resource control connected state.

2. The method of claim 1, wherein the paging includes an autonomous switching indication informing that the wireless device is able to perform the autonomous bandwidth part switching.

3. The method of claim 2, wherein the autonomous switching indication is configured per multicast session.

4. The method of claim 1, wherein the autonomous bandwidth part switching is performed without receiving any command for the autonomous bandwidth part switching from a network.

5. The method of claim 1, wherein the specific bandwidth part includes common frequency resources (CFR) for the multicast session.

6. The method of claim 1, further comprising:

receiving, by the wireless device, a multicast service based on the multicast session before entering the radio resource control idle state or the radio resource control inactive state.

7. The method of claim 1, wherein the paging does not include an identity (ID) of the wireless device.

8. The method of claim 1, wherein the wireless device supports a single active bandwidth part.

9. The method of claim 1, further comprising:

acquiring, by the wireless device, information on the specific bandwidth part while in the radio resource control connected state.

10. The method of claim 1, wherein the wireless device is in communication with at least one of a user equipment, a network, or an autonomous vehicle other than the wireless device.

11. A wireless device comprising:

a transceiver;

a memory; and at least one processor operatively coupled to the transceiver and the memory, and configured to perform operations, the operations comprising:

joining a multicast session, wherein the multicast session is provided in a specific bandwidth part;

entering a radio resource control idle state or a radio resource control inactive state;

monitoring an initial bandwidth part upon entering the radio resource control idle state or the radio resource control inactive state;

receiving a paging including a multicast session identity for the multicast session, wherein the paging is transmitted within the initial bandwidth part;

entering a radio resource control connected state based on the initial bandwidth part; and performing an autonomous bandwidth part switching to receive the multicast session by activating the specific bandwidth part and deactivating the initial bandwidth part upon entering the radio resource control connected state.

12. The wireless device of claim 11, wherein the paging includes an autonomous switching indication informing that the wireless device is able to perform the autonomous bandwidth part switching.

13. The wireless device of claim 12, wherein the autonomous switching indication is configured per multicast session.

14. The wireless device of claim 11, wherein the autonomous bandwidth part switching is performed without receiving any command for the autonomous bandwidth part switching from a network.

15. The wireless device of claim 11, wherein the specific bandwidth part includes common frequency resources (CFR) for the multicast session.

16. The wireless device of claim 11, wherein the operations further comprise:

receiving a multicast service based on the multicast session before entering the radio resource control idle state or the radio resource control inactive state.

17. The wireless device of claim 11, wherein the paging does not include an identity (ID) of the wireless device.

* * * * *